Jan. 6, 1931.                H. BARANOFF                1,788,270
EXPANSION ANCHORING DEVICE
Filed May 7, 1928
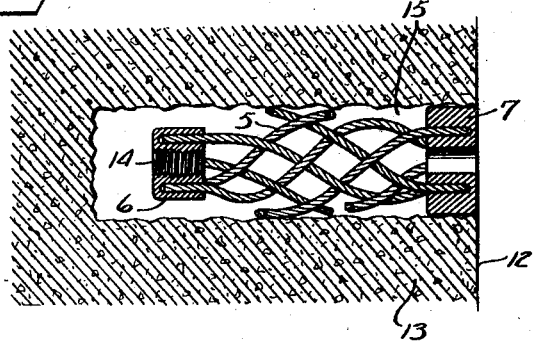
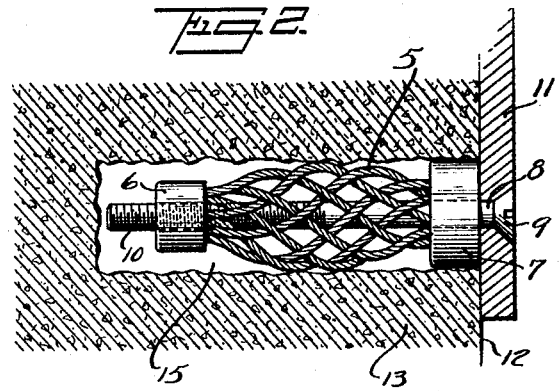
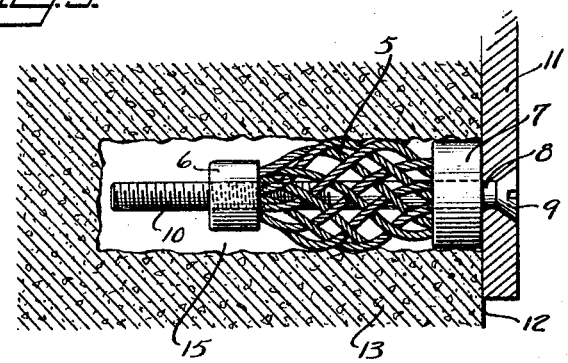
WITNESSES
INVENTOR
Harry Baranoff
BY
ATTORNEY Patented Jan. 6, 1931

1,788,270

UNITED STATES PATENT OFFICE

HARRY BARANOFF, OF NEW YORK, N. Y.

EXPANSION ANCHORING DEVICE

Application filed May 7, 1928. Serial No. 275,902.

This invention relates to anchoring devices which are particularly designed for attaching objects to a wall, ceiling or other surface, and the invention has particular reference to an expansion anchoring device for this purpose.

The invention primarily comprehends an expansion anchoring device which includes a tubular resilient body which is normally radially expanded and longitudinally contracted under its inherent resiliency, together with means extending therethrough and engageable therewith for effecting a further radial expansive action thereon to effectively retain the body in place within a preformed opening or recess.

More specifically, the invention comprehends an expansion anchoring device which consists of a substantially tubular cable like resilient fabric which inherently acts to radially expand and longitudinally contract itself and which is provided at its inner end with means adapted to interengage with a fastening element extending therethrough which serves upon relative rotation of said element to further increase the radial expansive action thereof to cause the body to bind within a preformed opening in a support to the surface of which an object is to be anchored and fastened.

Other objects of the invention reside in the comparative simplicity of construction of the device and its mode of use, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a sectional view of the body of the device inserted in the opening in the support.

Figure 2 is a similar view illustrating the body of the device in side elevation and with the fastening element in its initially applied position.

Figure 3 is a similar view illustrating the fastening device adjusted in a manner for effecting a further radial expansive action of the body to increase its anchoring impingement on the walls of the opening in the support.

Referring to the drawings by characters of reference, the anchoring device includes a substantially tubular resilient body 5 which is preferably in the nature of a tubular fabric or cable, the individual strands of which are sufficiently resilient to inherently effect a normal radial expansion to a predetermined degree and a consequent longitudinal contraction thereof. The inner end of the body 5 is provided with a collar 6 or its equivalent and the outer end with a collar 7 or its equivalent. A fastening element, such as a bolt 8 having a kerfed head 9 at its outer end and a threaded inner terminal 10, is adapted to be extended through the object 11 which is to be anchored or attached to the surface 12 of the wall 13 or other support, and is further adapted to be extended axially through the collars 6 and 7 and the body 5. The threaded inner end 10 is adapted to engage within the threaded bore 14 of the inner collar 6.

In use, the wall or support 13 is provided with a preformed opening or recess 15 of a cross sectional area or diameter slightly less than the normal expanded diameter or cross sectional area of the body 5. The body 5 is then forced into the opening or recess 15, as illustrated in Figure 1, it being obvious that the expansive action thereof will serve to retain it in place. The fastening element or bolt 8 is then passed through an opening in the object 11 and the shank of the bolt inserted through the outer collar 7, the outer surface of which is disposed substantially flush with the outer surface 12 of the wall or support 13. The bolt shank is advanced axially through the body 5 and its threaded terminal 10 is engaged with the threaded bore 14 of the inner collar 6.

By turning or rotating the bolt 8, it is obvious that the collar 6 will be advanced outwardly toward the collar 7 to longitudinally contract and radially expand the body 5 within the opening for impinging the strands of the body against the walls of the opening to securely anchor the body therein and to fasten the body 11 in flat contact with the surface 12 of the wall or support 13. It is obvious that a device of this character is ideal for anchoring or attaching an object to the surface of an overhead support or ceiling in view of the fact that the body will retain itself within the opening while the object and the fastening device therefor are being properly positioned. It is also apparent that the inherent expansive quality of the body 5 serves to prevent rotation of the same with the belt or fastening device 8 when the same is being turned for the purpose of radially expanding the body in the opening.

What is claimed is:

1. An expansion anchoring device including a tubular resilient body of woven stranded material normally expanded radially and interengageable means carried respectively by the opposite ends of said body, extending therethrough for effecting a further radial expansion thereof.

2. An expansion anchoring device including a tubular radially expansible body of a resilient woven stranded material normally expanded medially under its inherent resiliency and an attaching element extending axially therethrough and engageable therewith for effecting a further radial expansion thereof.

3. An anchoring device of the character specified including an expansible member formed of a stranded woven material inherently resilient to normally expand radially to a diameter exceeding the diameter of a preformed opening in which the device is to be arranged and means for attaching an object thereto extending axially through said member for effecting longitudinal contraction thereof and further radial expansion of the same to frictionally jam and retain the device within the preformed opening.

Signed at New York, in the county of New York and State of New York, this 4th day of May, 1928.

HARRY BARANOFF.